United States Patent
Bonke (10) Patent No.: US 6,692,805 B2
(45) Date of Patent: Feb. 17, 2004

(54) PLASTIC WRAP WITH CLING LAYER

(75) Inventor: Douglas D. Bonke, Appleton, WI (US)

(73) Assignee: Reynolds Metals Company, Richmond, VA (US)

( * ) Notice: Subject to any disclaimer, the term of this patent is extended or adjusted under 35 U.S.C. 154(b) by 190 days.

(21) Appl. No.: 09/917,927

(22) Filed: Jul. 31, 2001

(65) Prior Publication Data

US 2002/0037386 A1 Mar. 28, 2002

Related U.S. Application Data (60) Provisional application No. 60/222,037, filed on Jul. 31, 2000.

(51) Int. Cl.[7] .................................. B32B 27/32
(52) U.S. Cl. ............ 428/40.1; 428/42.1; 428/119; 428/120; 428/156; 428/167; 428/172
(58) Field of Search .............. 428/40.1, 42.1, 428/156, 167, 172, 119, 120

(56) References Cited

U.S. PATENT DOCUMENTS

| | | |
|---|---|---|
| 4,367,256 A | 1/1983 | Biel |
| 4,386,124 A | 5/1983 | Akao |
| 4,425,268 A | 1/1984 | Cooper |
| 4,436,788 A | 3/1984 | Cooper |
| 4,504,434 A | 3/1985 | Cooper |
| 4,542,188 A | 9/1985 | van der Heijden |
| 5,006,398 A | 4/1991 | Banerji |
| 5,085,927 A | 2/1992 | Dohrer |
| 5,093,188 A | 3/1992 | Dohrer |
| 5,139,855 A | 8/1992 | Fujitani et al. |
| 5,141,809 A | 8/1992 | Arvedson et al. ............ 428/349 |
| 5,175,049 A | 12/1992 | Huff et al. |
| 5,248,547 A | 9/1993 | Wilson |
| 5,261,536 A | 11/1993 | Wilson |
| 5,273,809 A | 12/1993 | Simmons |
| 5,399,426 A | 3/1995 | Koch et al. |
| 5,431,284 A | 7/1995 | Wilson |
| 5,617,707 A | 4/1997 | Simmons |
| 5,752,362 A | 5/1998 | Eichbauer |
| 5,874,139 A | 2/1999 | Bosiers et al. |
| 5,907,943 A | 6/1999 | Eichbauer |
| 5,919,863 A | 7/1999 | Seppanen et al. |
| 5,948,493 A | 9/1999 | Groeger |
| 6,015,524 A | 1/2000 | Kuder et al. |
| 6,017,991 A | 1/2000 | Drummond et al. |
| 6,028,132 A | 2/2000 | Hayashi |
| 6,299,966 B1 * | 10/2001 | Bonke ........................ 428/173 |

* cited by examiner

Primary Examiner—Nasser Ahmad
(74) Attorney, Agent, or Firm—Tracey D. Beiriger (57) ABSTRACT

A three-layer microwaveable, plastic wrap having a core layer between a cling layer and a release layer is disclosed, along with a method for making the plastic wrap. The cling layer comprises a base resin and an effective amount of a tackifier to provide sufficient cling to different surfaces such as, for example, glass, plastic, ceramic, stainless steel laminated cardboard, and aluminum. The release layer includes an effective amount of an anti-blocking agent to facilitate dispensing of the wrap from a dispensing roll.

29 Claims, 5 Drawing Sheets

PLASTIC WRAP WITH CLING LAYER

CROSS REFERENCE TO RELATED APPLICATION

This application claims priority from pending provisional application Ser. No. 60/222,037, filed Jul. 31, 2000, entitled "Plastic Wrap with Cling Layer", assigned or under obligation of assignment to the same entity as this application, having one or more inventors in common with this application, and which application is incorporated by reference to the extent that it is consistent with the invention of this application and the application.

FIELD OF THE INVENTION

The invention relates to a microwaveable plastic wrap having an adhesive or cling layer, and a method for making the plastic wrap. The plastic wrap has a good balance of cling properties with handling properties such as tear-bar resistance and the ability to separate the plastic wrap from itself. The cling layer exhibits sufficient cling force to stick to different substrates such as, for example, glass, plastic, ceramic, stainless steel, laminated cardboard, and aluminum.

BACKGROUND OF THE INVENTION

Thermoplastic resin films are used as household plastic wraps to contain food and other items by clinging to one or more surfaces of the container in which the food is housed or to itself to thereby provide a seal which reduces the degree of exposure of the contents of the container to the environment. A necessary characteristic of such plastic wrap film is the ability to "cling," that is, to adhere to itself or to form a tight seal with other surfaces, as when the film is used as a cover for containers. Plastic wrap films can be employed to preserve the freshness and moisture content of wrapped food items and to prevent the migration of food odors.

Thermoplastic resin films do not generally possess inherent cling characteristics sufficient to adhere satisfactorily to themselves and other surfaces. The cling characteristic of thermoplastic films is generally obtained through the use of so-called cling agents or adhesives. Adhesives are chosen for their ability to produce a surface on a thermoplastic film that can be sealed, opened and resealed, and are selected with due care in consideration of the use of thermoplastic films in direct food contact applications.

A balance must be attained between the film's "cling" and "handling" or "handleability" characteristics. "Handleability" is the characteristic of the film to resist inadvertent clinging to itself and to other surfaces during use. While adhesives impart good cling properties to the film, it has generally been observed that an increase in the amount of adhesives incorporated into the film to enhance the cling provides a corresponding decrease in the handleability of the film. With an increased adhesive amount, the tendency of the film to inadvertently adhere to itself and to other surfaces increases. One type of inadvertent sticking is known as premature sticking; that is, before the adhesive film can be properly positioned over a target surface, inadvertent contact of the adhesive with the target surface or the plastic wrap itself causes premature sticking at one or more positions, thereby inhibiting proper positioning of the plastic wrap for use.

Finally, with the increased use of microwave ovens, it has become desirable for plastic cling wraps to be used in microwave applications. All plastic wraps today are not suitable for such use. For example, standard polyethylene wraps will melt in microwave ovens after two-three minutes of microwave exposure.

SUMMARY OF THE INVENTION

It is an object of the invention to provide a multi-layer plastic wrap having a cling layer that exhibits sufficient cling to different substrates such as, for example, glass, plastic, ceramic, stainless steel, laminated cardboard, and aluminum.

It is a further object of the invention to provide a plastic wrap which exhibits a good balance of cling properties with handling properties such as tear-bar resistance, and the ability to separate the plastic wrap from itself.

It is a further object of the invention to provide a plastic wrap which includes a cling layer integral to the film which provides an adhesive that remains with the film upon removal from the container to which it had been sealed.

It is yet another object of the invention to provide a microwaveable plastic wrap that is acceptable for direct food contact.

It is another object of the invention to provide a method for producing the plastic wrap.

Other objects of the invention will become apparent to those skilled in this art from the following description.

In its broadest sense, the invention relates to a plastic wrap which includes a release layer made from a polyolefin resin. The polyolefin resin should have a sufficiently high melting point and resistance to heat for direct food contact microwave re-heating. Examples of polyolefin resins that can be used to make the release layer of the present invention plastic wrap include polypropylene homopolymer or polypropylene/ethylene copolymer. The release layer also should contain an effective amount of an anti-blocking agent to provide sufficient release properties to the release layer to facilitate dispensing of the plastic wrap from a dispensing roll.

The plastic wrap should further include a cling layer and an intermediate or core layer positioned between the release and cling layers. The cling layer should contain a base resin and an effective amount of a tackifier to provide sufficient cling to different substrates such as, for example, glass, plastic, ceramic, stainless steel, laminated cardboard, and aluminum. The base resin may be an ethylene vinyl acetate ("EVA"), or preferably an ethylene methyl acrylate ("EMA"), resin. The tackifier may be a styrene-isoprene-styrene (SIS) block copolymer in combination with a rosin ester tackifier. The core layer can be made from a polyolefin resin such as HDPE, LDPE, LLDPE, and mixtures thereof.

The intermediate layer of the plastic wrap may be bonded to the outer release layer and cling layer using any suitable bonding materials or methods now known or later developed. The plastic wrap may be coextruded, as opposed to laminated, and a multi-manifold slot cast die may be employed to form the film. Alternatively, an air blown film tubular co-extrusion method may be used. Before extrusion, the different materials comprising the various layers may be mixed. The mixed components of each of the layers may be loaded into a hopper and then gravity fed into an extruder, although the base resin and tackifier may require compounding before being fed into the extruder as well.

One embodiment of the invention may use a single-manifold slot cast die and multilayer adapter for the slot cast die. An alternative embodiment may feed a hot melt adhesive including the base resin and the tackifier in a liquid form directly through a die adapter and to the die, where it may be joined with the extruded release and intermediate layers to form a film. Commercial hot melt adhesives that include tackifiers and carrier resins are available from 3M, among other vendors, or hot melt adhesives may be custom blended to include desired tackifiers and carrier resins.

The invention also relates to a method for making the plastic wrap. The film may be produced by mixing a first polyolefin and an antiblocking agent to form a first polyolefin composition, mixing a base resin and a tackifier, feeding the first polyolefin composition into an extruder to form a first extruded layer, feeding a second polyolefin into another extruder to form a second extruded layer, feeding the base resin and tackifier mixture into yet another extruder to form a third extruded layer, and joining the first extruded layer, the second extruded layer, and the third extruded layer to form a film, preferably substantially simultaneously.

The film obtained from the extrusion may be cooled, and then embossed to form the final plastic wrap. Cooling may take place by contacting the film on a chill roll for the slot cast die methods, or air cooling for the air blown film tubular co-extrusion method. Post-extrusion embossing requires a second heating of the film on a heated steel embossing roll for thermosetting, followed by a second quench on a chill roll to set the embossment. One advantage to post-extrusion embossing is that product identification markings may be added by embossing, as opposed to printing such markings on the plastic wrap as is typically done in the industry. The act of printing can have adverse effects on the property of the plastic wrap. Alternatively, the plastic wrap may be embossed as it exits the die.

The plastic wrap is advantageous because it is microwaveable, it clings to a variety of different surfaces and it is easily dispensed from a dispensing roll.

As used in this specification, good tear-bar resistance is considered the tendency of a plastic wrap to tear as measured by techniques known in the art. The ability to separate plastic wrap from itself is measured by a plastic wrap's tendency to cling to itself, as measured by techniques known in the art.

BRIEF DESCRIPTION OF THE DRAWINGS

The various aspects and advantages of the invention will become more apparent as a description of various embodiments of the invention is given with reference to the appended drawings wherein.

DETAILED DESCRIPTION OF THE INVENTION

Figure 1:
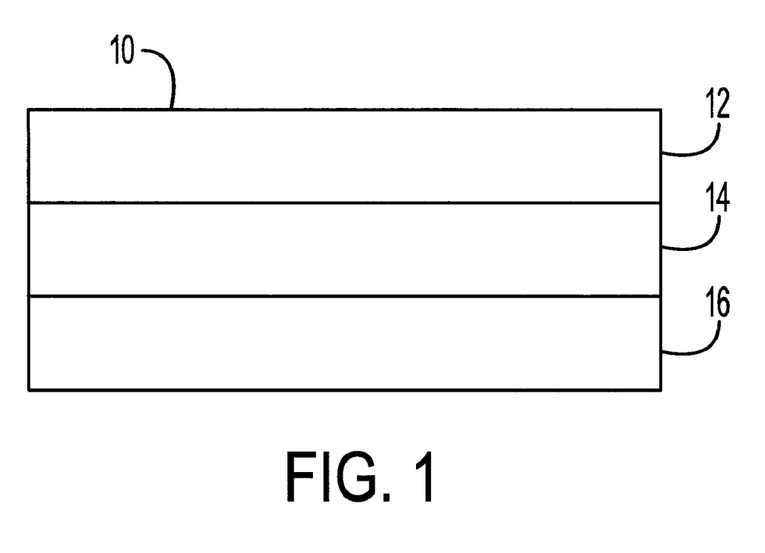
FIG. 1 is a simplified schematic of a three-layer plastic wrap film constructed in accordance with the invention.

Referring to FIG. 1, a three-layer plastic wrap 10 is provided in accordance to the invention. The plastic wrap 10 comprises a release layer 12, an intermediate or core layer 14, and a cling layer 16. The release layer 12 can be made from a polyolefin resin having a sufficiently high melting point and resistance to heat for direct food contact for microwave re-heating and should contain an effective amount of an anti-blocking agent. Examples of polyolefin resins that can be used to make the release layer 12 include preferably polypropylene homopolymer or polypropylene/ ethylene copolymer. Suitable polypropylene homopolymers typically are high clarity grades with a controlled rheology, such as AtoFina 3868, available from AtoFina located in Dallas, Tex.

Preferably, the polypropylene used in the release layer is a homopolymer having a melt flow rate (MFR) of at least 10, more preferably from about 20 to about 50, and most preferably from about 30 to about 40 grams per 10 minutes. Polypropylene resins with a lower melt-flow rate than about 10 can make the plastic wrap difficult to tear off a dispensing roll and are less preferred. AtoFina 3825 is a homopolymer polypropylene with the correct flow properties that could be used, although it does not have the more desirable optical properties.

Other suitable polyolefin resins that can be used in the release layer include polyolefins having a sufficiently high melting point and resistance to heat for use in direct, food contact for microwave re-heating such as polypropylene resins having a small amount of ethylene incorporated therein, preferably in an amount ranging up to about 5 percent by weight. Suitable polypropylene/ethylene copolymers are available from AtoFina, Amoco, or Exxon/Mobil.

The release layer 12 should further include an antiblocking agent used in an effective amount to provide sufficient release properties to the release layer 12 so that a consumer can easily dispense the plastic wrap from a dispensing roll.

The concentration of the anti-blocking agent incorporated into the release layer of the plastic wrap may range from about 1,000 to about 25,000 ppm, most preferably from about 15,000 to about 20,000 ppm based on the total weight of the release layer 12. Preferred anti-blocking agents suitable for use in the plastic wrap of the invention include commercially available silica products having a substantially uniform particle size, preferably silicas having an average particle size of about 3 microns or less. Particularly preferred silicas are molecular sieve silicas such as the molecular sieve silica supplied by UOP under the name Abscents 3000. Other anti-blocking agents known to those skilled in the art may also be employed such as calcium carbonate and talc. Mixtures of any two or more of the antiblocking agents may also be used.

The HDPE and antiblocking agent should be selected to maximize the clarity of the plastic wrap.

The core layer 14 can be made from a polyolefin resin such as HDPE, LDPE, LLDPE, and mixtures thereof. The core layer should preferably exhibit low permeability to moisture and food odor and generally low tear resistance. The core layer is preferably made of HDPE or a mixture of HDPE with LLDPE with the amount of LLDPE in the mixture being less than about 40 percent by weight, preferably less than about 30 percent by weight, and more preferably less than about 20 percent by weight. In one embodiment, the core layer is made from a polyolefin comprising HDPE in an amount of from about 70 percent to about 95 percent and LLDPE from about 30 to about 5 percent by weight.

The HDPE used in the core layer may have a density of from about 0.940 to about 0.960, preferably of from about 0.950 to about 0.960 grams/cm$^3$. A preferred HDPE is Sclair 2908 supplied by Nova Chemicals of Pittsburgh, Pa. The melt index (MI) of the HDPE may range from about 1 to about 20, preferably from about 5 to about 20, and more preferably from 5 to about 10 grams per 10 minutes.

The LLDPE may have a density of greater than about 0.920 gm/cm$^3$ and an MI of about 2 to about 10 grams per 10 minutes. The LLDPE must be compatible with the HDPE. If the LLDPE is not compatible with the HDPE, surging may occur in the extruder resulting in drastic gauge changes or visual defects in the film. A preferred LLDPE is Dowlex 2036 supplied by Dow Chemicals, from Midland, Mich.

The core layer 14 may also include an anti-blocking agent in the amount of about 1,000 to about 25,000 ppm, most preferably from about 15,000 to about 20,000 ppm based on the total weight of the core layer 14. Preferred anti-blocking agents suitable for use include commercially available silica products having a substantially uniform particle size, preferably silicas having an average particle size of about 3 microns or less. Particularly preferred silicas are molecular sieve silicas such as the molecular sieve silica supplied by UOP under the name Abscents 3000. Other anti-blocking agents known to those skilled in the art may also be employed such as calcium carbonate and talc. Mixtures of any two or more of the antiblocking agents may also be used.

The cling layer 16 may comprise a base resin and an effective amount of a tackifier. Examples of resins that may be used as the base resin include EMA or EVA resins. The base resin is preferably employed in an amount of from about 50 to about 70 weight %, and more preferably about 60 weight % based on the total weight of the cling layer 16. A suitable EVA is LD-761.36 available from Exxon/Mobil Chemicals in Houston, Tex.

The EMA resin contains preferably from about 12 to about 24 percent by weight methyl acrylate (MA). Also preferably, the EMA has an MI ranging from about 3 to about 10, more preferably from about 3 to about 7 grams per 10 minutes. A preferred EMA is TC-220 supplied by Exxon/Mobil Chemicals of Houston, Tex.

Examples of preferred tackifiers include mixtures of rosin esters and styrene-isoprene-styrene (SIS) block copolymers.

SIS block copolymer preferably includes less than about 20 weight % styrene and preferably about 20 weight %, a diblock content of greater than about 25 percent by weight and has an MFR of greater than about 10 grams per 10 minutes. In one embodiment, an SIS block copolymer supplied by Dexxco Polymer under the name Vector 4114 includes about 15 percent by weight styrene content, a diblock content of about 40 percent by weight and has an MFR of from about 20 to about 30 grams per 10 minutes. The SIS block copolymer is employed in an amount of at least 5 percent by weight, preferably from about 10 to about 20 percent by weight and more preferably from about 10 to about 15 percent by weight based on the total weight of the cling layer 16.

The rosin ester tackifier can be any of well known rosin ester tackifiers. Preferred rosin ester tackifiers should be compatible with the base resin and the SIS. No migration of the rosin ester tackifier out of the cling layer should be observed in a compatible combination. Further, compatible combinations should not cause holes or burns in the die during extrusion. Examples of preferred rosin ester tackifiers are Sylvaros™ PR R85 and Sylvaros™ PR 295 which are available from Arizona Chemical located in Panama City, Fla. Preferably, the rosin ester tackifier is employed in an amount of from about 1 to about 30, more preferably from about 20 to about 30, and most preferably from about 20 to about 25 percent by weight, based on the total weight of the cling layer 16.

In one embodiment, the cling layer 16 is made by compounding a first binary composition comprising the base resin and the SIS, and a second binary composition comprising the base resin and the rosin ester tackifier. The first binary composition may comprise about 60 weight % to about 50 weight % base resin and about 40 weight % to about 50 weight % SIS. The second binary composition may comprise about 60 weight % to about 50 weight % base resin and about 40 weight % to about 50 weight % rosin ester tackifier.

It has been unexpectedly discovered that the rosin ester and SIS act synergistically with the base resin to provide the cling layer with sufficient tack or cling to different surfaces such as, for example, glass, plastic, ceramic, stainless steel, laminated cardboard, and aluminum. A preferred combined level of SIS plus rosin ester tackifier is about 40 weight %, based on the total weight of the cling layer 16.

Preferably, the overall thickness of the three-layer plastic wrap is from about 0.3 to about 1.0 mils, more preferably from about 0.7 to about 0.8 mils. Also preferably, the plastic wrap has an overall weight ratio of the release layer 12 to the intermediate layer 14 to the cling layer 16 of from about 5/90/5 to about 30/40/30, most preferably about 20/55/25. In general, the thickness of the release layer 12 is between about 0.05 to about 0.15 mils, the thickness of the intermediate layer 14 is between about 0.4 to about 0.5 mils, and the thickness of the cling layer 16 is between about 0.05 to about 0.20 mils.

The cling force of the cling layer 16 of the plastic wrap to the cling layer 16 of a like plastic wrap of substantially identical composition should be between about 300 to about 500 grams as measured in accordance with ASTM D4649. The cling force of the release layer 12 to the cling layer 16 should be easily overcome by the force exerted by the hand of a consumer who attempts to dispense the plastic wrap from a roll inside a carton. Such force should typically be less than about 100 and preferably less than about 50 grams as measured in accordance with ASTM D4649. Finally the cling force of the release layer 12 to another release layer of a substantially identical film should range from about 0 to about 10 grams as measured in accordance with ASTM D4649.

The resistance to tearing of the plastic wrap of the invention on a standard dispensing roll tear bar should be less than about 300 grams, preferably from about 50 grams to about 200 grams, and more preferably from about 50 grams to about 100 grams, as measured in accordance with ASTM D1922.

Any suitable bonding material or method may be employed to bond the intermediate layer to each of the outer layers in the three-layer embodiment of the plastic wrap of this invention. The plastic wrap of this invention may be produced by any of several well-known methods. Preferably, the plastic wrap may be produced by co-extrusion, such as slot cast film co-extrusion or air blown film tubular co-extrusion methods, but this latter method is less preferred. The various anti-blocking agents as well as any other conventional additives can be incorporated into the layers of the plastic wrap of this invention by mixing the agents with the resin, preferably prior to extrusion thereof. One extruder per layer is preferred, however one skilled in the art will appreciate that multiple extruders per layer could be utilized as needed.

A film may be formed by joining the three layers in a slot cast die on conventional extrusion equipment using a multi-manifold slot cast die or a conventional single-manifold slot cast die and multilayer adapter for the slot cast die. A preferred method uses the multi-manifold slot cast die because of the viscosity differences of the various layers. The multi-manifold slot cast die optimizes the uniformity of the layer ratio which in turn affects the tear resistance of the plastic wrap. In other embodiments, the base resin and tackifier may be included in a hot melt adhesive, where the liquid hot melt may be fed directly into a die adapter and a die along with the extruded release and intermediate layers to be joined to form a film. The co-extruded film is preferably quenched to about 80 to about 90° F. (26.7–32.2° C.) on a chill roll after extrusion for the slot cast film coextrusion methods. For the air blown film tubular coextrusion method, the co-extruded film is forced air cooled after extrusion.

Due to the nature of the cling layer, the cling layer maximum extruder temperature should be held between about 350 degrees F and about 420 degrees F, with the maximum temperatures of the release and intermediate layers held at or below 430 degrees F to 480 degrees F, or within about 30 degrees F of the cling layer temperature.

It should be appreciated by those skilled in this art that other layers may be included in the plastic wrap of the present invention depending on the desired properties. For example, according to one embodiment, the plastic wrap may further comprise an additional oxygen barrier layer between the cling layer and the release layer. The oxygen barrier layer is preferably made from an ethylene vinyl alcohol, polyester, a nylon resin or combinations thereof. In one embodiment, the plastic wrap may comprise a cling layer, an oxygen barrier layer, a core layer, and a release layer, in that order. In another embodiment, the plastic wrap may comprise a cling layer, a core layer, an oxygen barrier layer, and a release layer, in that order. In another embodiment, the oxygen barrier layer could be sandwiched between two separate core layers which are then located between the cling layer and the release layer.

According to one embodiment of the invention, the plastic wrap can be embossed to form a plurality of protrusions or textured elements and a base area (or surface). The embossing reduces the surface contact between the cling and the surface of the release layer when the plastic wrap is wound on a dispensing roll, thus further improving the handleability characteristics of the plastic wrap. The protrusions should be sufficiently high to substantially prevent the base surface of the cling layer from contacting the release layer of the plastic wrap or other surfaces during winding and handling of the plastic wrap prior to its application, thus providing good handleablility of the plastic wrap.

The geometry and frequency of the protrusions should be such as to balance the total surface area of the raised surfaces with that of the non-raised (valley area) since these raised surfaces are destined for direct contact with the surface of an adjacent release layer of the plastic wrap when the wrap is wound on a dispensing roll. On the other hand, the protrusions must have sufficient strength to support nominal pressures such as those experienced during winding and handling of the plastic wrap. Those skilled in the art will understand that this is referred to as having the proper density of protrusions as a function of adhesive level. The embossed area contains 150–500 protrusions per square inch of plastic wrap, and preferably about 300–400 protrusions per square inch of plastic wrap. The protrusions must also be capable of substantially collapsing under moderate pressure such as would be applied when pressing the plastic wrap onto an object with the intention of causing the plastic wrap to adhere to the object.

The protrusions may be of any suitable shape. The plurality of protrusions may be formed by thermoforming via application of heat to the plastic wrap and mechanically embossing the plastic wrap into a rubber surface from the opposite surface of the plastic wrap with a metal roll. Such thermoforming methods are well known in the art, as are other methods of embossing polyolefin films such as those employed to fabricate the plastic wrap of the present invention. Each protrusion preferably has a height of about 3 to about 5 times the total thickness of the plastic wrap, more preferably from about 4 to about 5 times the thickness of the plastic wrap to thereby provide a sufficient spacing between the base surface of the cling layer and the surface of the adjacent release layer of the plastic wrap while at the same time minimize the total thickness of the plastic wrap so that a maximum amount of plastic wrap can be stored on a single roll. Typically, the maximum height of the protrusions is about 6.0 mils with a more preferred height being in the range of from about 3.0 to about 5.0 mils, and more preferably from about 4.0 to about 5.0 mils.

Preferably, the plurality of the protrusions are formed after fabrication of the film material which forms the plastic wrap in order to best preserve the optical clarity of the plastic wrap. After the film material has been quenched following extrusion, it may be brought in contact with an embossing roll, preferably made of metal such as chrome plated steel, which has been heated to from about 160 degrees F to about 190 degrees F, and maintained within several degrees, e.g., one to two degrees F, of the operating temperature. Following embossing, the heated embossed film material is quenched on a chill roll to about 50 degrees F. The embossing roll can be heated and maintained at temperature by any method known in the art, such as with hot oil.

The preferred backup roll for embossing the cling layer has a 65–90 durometer, and preferably a 75 durometer hardness. In one embodiment, the backup roll was procured from Valley Roller Company of Appleton, Wis. under the name Durarelease. The backup roll had the characteristics of having a high release character and good durability. High release character can be determined visually when embossing. During the embossing process, the film is heated when it contacts the heated steel roll, and the cling layer will adhere to and have a tendency to wrap onto the backup roll, causing wrinkles or winding defects in the film. The heated film should release off the backup roll with minimal adhering to keep the web (or film) and process stable. Durability is a relative term. To obtain the desired final overall film thickness, the temperature, the pressure exerted on the roll and the depth of penetration into the backup roll must be balanced. In one embodiment, the embossing roll may be pressed into the backup roll about 25–30 mils and have a pressure of at least 30 PLI (pounds per linear inch). The backup roll can tend to crack and wear out under these conditions unless it is made with durable materials. Constant adjustments to the depth of press into the backup roll and pressure may be needed if a poor quality backup roll is selected.

Without intending to be bound by any theory of operation, it is believed that the choice of HDPE in the core layer and the antiblocking agent affect the clarity of the plastic wrap of the invention as measured by known techniques, such as colorimetry or with a hazemeter which measure haze and/or opacity. In a preferred embodiment, the clarity of the plastic wrap of the invention measures about 10% haze before embossing, and about 30% or less haze after embossing.

After embossing, the embossed plastic wrap can be wound under low winding tensions, less than about 0.5 PLI and preferably from about 0.2–0.3 PLI, to be adjusted as needed.

Figure 2:
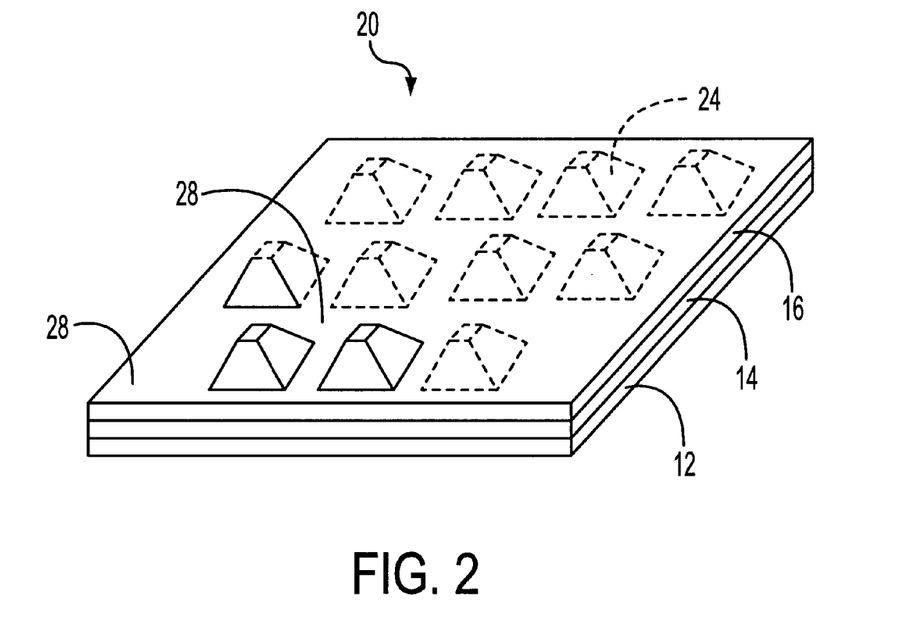
FIG. 2 is a top view of an embossed plastic wrap constructed in accordance with one embodiment of the invention.

FIG. 2 is a top view of a plastic wrap 20 which is embossed according to one embodiment of the invention. The plastic wrap 20 is embossed to form a plurality of protrusions 24, and a base area 28 on the cling layer 16.

Figure 3:
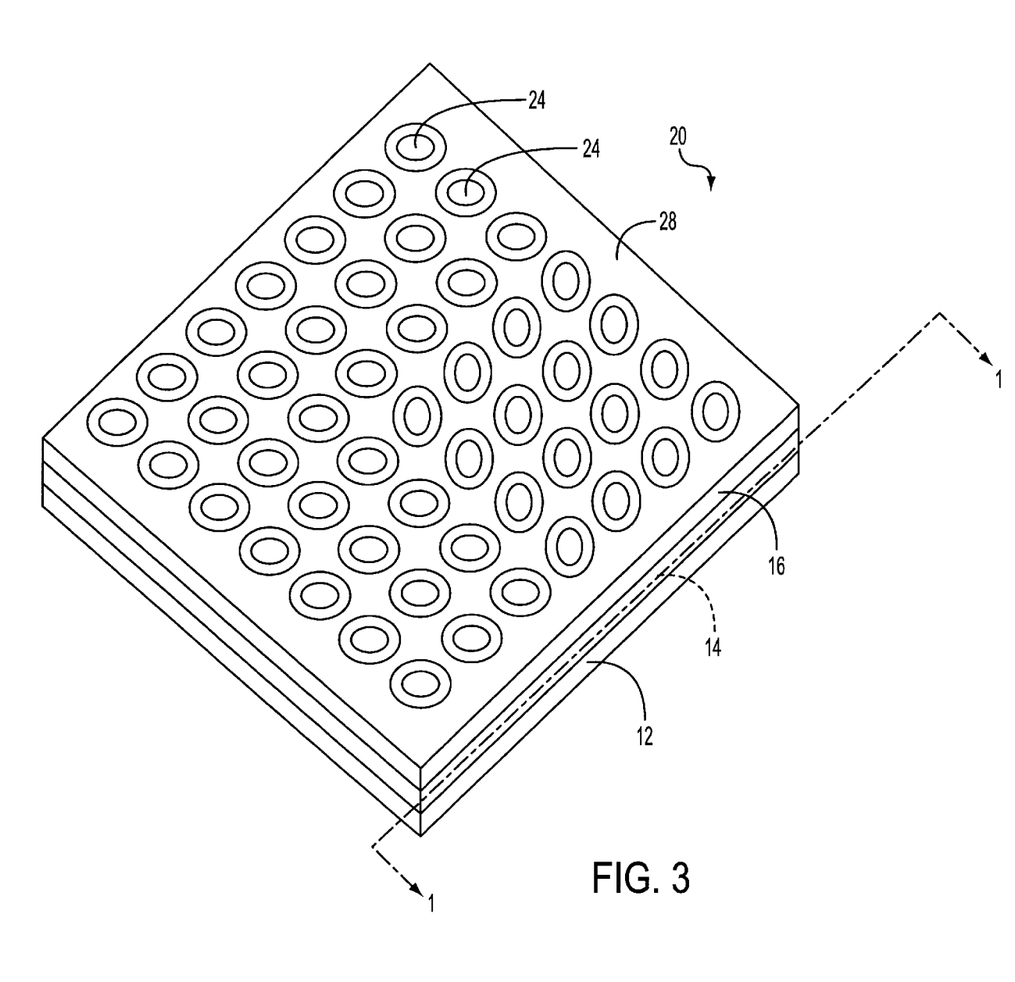
FIG. 3 is a top view of an embossed plastic wrap constructed in accordance with another embodiment of the invention.

FIG. 3 is a top view of a plastic wrap 20 which is embossed according to a preferred embodiment of the invention. The plastic wrap 20 is embossed to form a plurality of protrusions 24, and a base area 28 on the cling layer 16.

Figure 4:
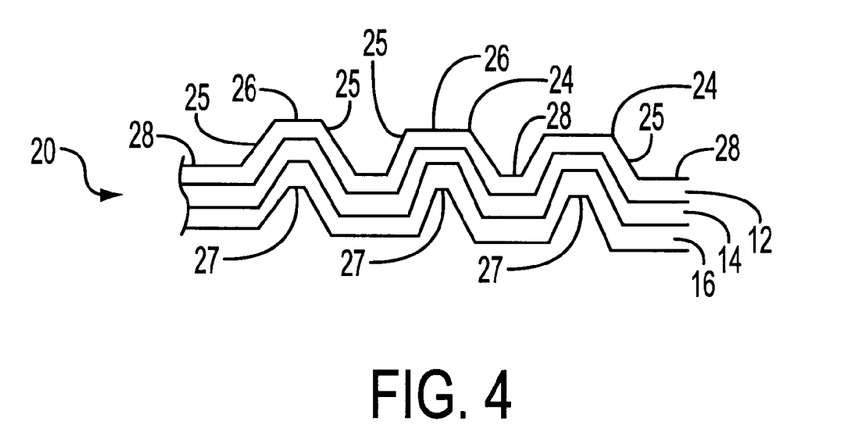
FIG. 4 is a cross-sectional view of the embossed plastic wrap of the embodiment of FIG. 3 along line 1—1.

FIG. 4 is a cross-sectional view of the embossed plastic wrap of FIG. 3 along line 1—1. Plastic wrap 20 comprises a core layer 14 and two outer layers 12 and 16 as shown in the embodiment of FIG. 1. The plastic wrap has a first surface having a plurality of protrusions 24 and a base area 28. Each protrusion has a side surface 25, and a raised contact surface 26. The plastic wrap has a second surface which has a plurality of recesses 27 that correspond to the protrusions 24 of the first surface.

Preferably, the plastic wrap is embossed according to the method described in commonly assigned, co-pending U.S. patent application Ser. No. 09/404,814 filed on Sep. 24, 1999, which is incorporated herein by reference for all purposes to the extent that is not inconsistent with the present disclosure and claims.

Figure 5:
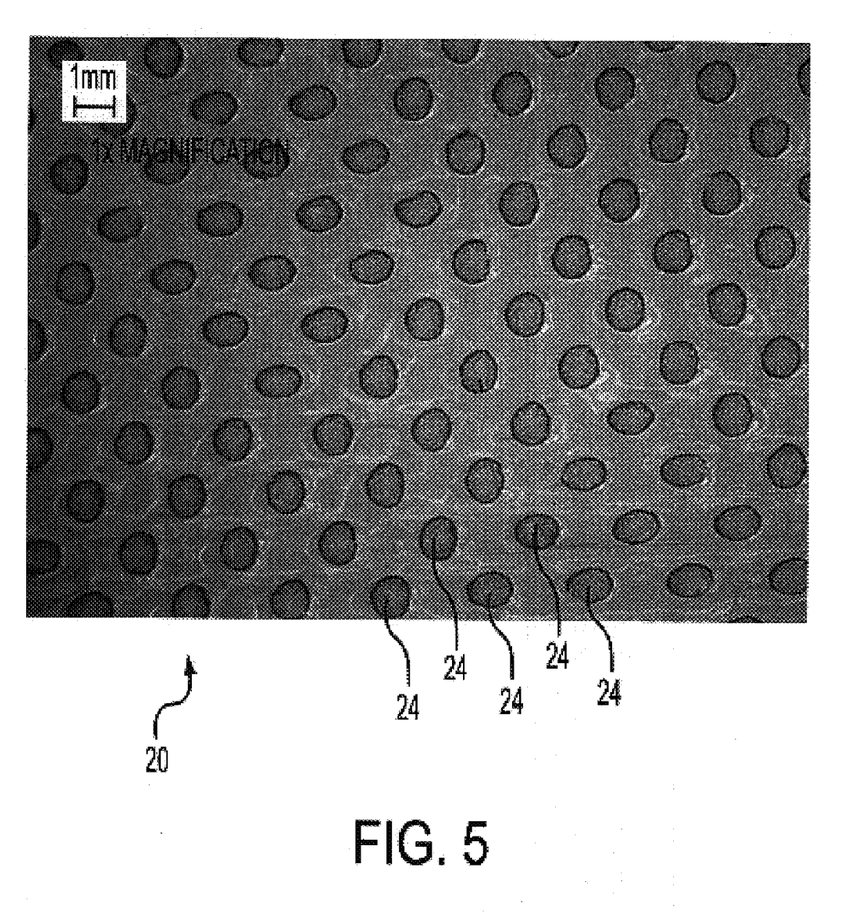
FIG. 5 is a photographic view of the embossed plastic wrap of one embodiment of the invention showing the pattern of distribution and size of the oval protrusions.

FIG. 5 is a top view photograph of the protrusions 24 which were embossed after formation of the plastic wrap 20 in the embodiment of the invention shown in FIG. 4.

The invention will become more apparent when considered together with the following examples, which are set forth as being merely illustrative of the invention and are not intended, in any manner, to be limiting. The scope of the invention is to be determined from the claims appended hereto. Unless otherwise indicated all parts and percentages are by weight.

EXAMPLES

General Procedure

In preparing the plastic wraps of the following examples the resin film-forming composition of each layer was fed into a feed hopper of a conventional rotating screw extruder. The core extruder screw employed had an approximately 2.5 inch diameter and a length to diameter, L/D, ratio of about 24 to 1. Satellite extruders were used for the co-extrusion of the resin film-forming compositions of the cling and release layers. The satellite extruders comprised a conventional extruder having an extruder screw with about a 2.0 inch diameter and a L/D ratio of about 24 to 1. Molten resin from the satellite and core extruders were fed to an adapter specifically designed to join polymer streams from the satellite and core extruders and channeled them into a multi-manifold cast die in the correct shape, size, and amount to achieve the desired layer ratios. The polymer streams remained separate until about 2 inches from the lip of the die to minimize layer ratio, non-uniformity. A single manifold die and a feed block with specially designed vanes may also be used to make the three layer wrap of the invention, however, it is generally more difficult to achieve similar layer ratio uniformity as with the multi-manifold cast die process.

Example 1

A three-layer, co-extruded wrap was made having a core layer B and two outer layers, A and C. Layer A was made of polypropylene having an MFR of 35 grams per 10 minutes and containing about 18,000 ppm of a uniform particle size silica molecular sieve antiblocking agent, based on the total weight of Layer A. Prior to mixing with the polypropylene, the antiblocking agent Abscents 3000 was sent to Colortech, Inc., located in Morristown, Tenn., where a concentrate of about 30 weight % molecular sieve and 70 weight % LDPE was prepared. The concentrate was mixed with the polypropylene before being fed into the feed hopper of the extruder in a ratio of 6 weight % concentrate and 94 weight % polypropylene. The molecular sieve had an average particle size of less than about 3 microns. Layer B was made from 80% high density Sclair 2908 polyethylene having an MI of 7 grams per 10 minutes and a density of about 0.960 gm/cm$^3$ and 20% linear low density Dowlex 2036 polyethylene, i.e., LLDPE, having an MI of 3 grams per 10 minutes and a density of about 0.935 gm/cm$^3$.

Layer C was made from a mixture comprising 60 percent by weight TC-220 EMA, 16 percent by weight SIS resin, and 24 percent by weight of the rosin ester tackifier, based on the total weight of Layer C. The EMA was 24 weight % MA and had a MI of 5 grams per 10 minutes. The SIS resin was Vector 4114 supplied by Dexxco Polymer and the rosin ester tackifier was Sylvaros™ PR R85 supplied by Arizona ID Chemical. The co-extruded film was quenched to about 80–90° F. (26.7–32.2° C.) on a chill roll following extrusion. The weight percentages of each layer A, B and C based on the total plastic wrap weight were about 20/65/15, respectively.

Example 2

The three-layer plastic wrap as in Example 1, except that the EMA was used in an amount of 60 percent by weight, the rosin ester tackifier in an amount of 28 percent by weight, and the SIS resin in an amount of 12 percent by weight, based on the total weight of Layer C.

Example 3

The three-layer plastic wrap as in Example 1, where the SIS resin was mixed in a first combination with EMA in a ratio of about 60 weight % EMA and 40 weight % SIS. The rosin ester tackifier was mixed in a second combination with EMA in a ratio of about 60 weight % EMA and 40 weight % rosin ester tackifier. The first and second combinations were then mixed in proper proportions before being fed to the extruder hopper to give a final Layer C composition of about 60 weight % EMA, 16 weight % SIS, and 24 weight % rosin ester tackifier.

Example 4

The three-layer plastic wrap as in Example 1 may be made in the same manner with 20% MA EMA with an MI of about 3 grams per 10 minutes.

Example 5

The three-layer plastic wrap as in Example 1 may be made in the same manner with 20% EMA with an MI of about 5 grams per 10 minutes.

Example 6

The three-layer plastic wrap as in Example 1 can be made in the same manner except that Layer A can be made from a polypropylene material having an MFR of about 20 grams per 10 minutes.

Example 7

The three-layer plastic wrap as in Example 1 was made in the same manner except that intermediate Layer B was made of EQUISTAR NA-324-009 LDPE and WESTLAKE EP-310-AA LDPE in the ratio of approximately 80/20 by weight. The combination had an MI of about 3 grams per 10 minutes and a density of 0.930 gm/cm$^3$.

Example 8

The three-layer plastic wrap as in Example 1 was made in the same manner except that the weight percentage of each layer A, B, and C was about 20/55/25, respectively.

Example 9

The three-layer plastic wrap as in Example 1 is made in the same manner except that the core layer B is made from a HDPE.

Example 10

A three-layer plastic wrap as in Example 1 is made except that the film is embossed with a plurality of protrusions protruding from the C layer. The protrusions have the shape of ovals and a density of 367 elements/in$^2$. "Elements" is a term used by engravers skilled in the art to refer to protrusions. The protrusions prevent film blocking when in roll form and enhance dispensing from the dispensing roll. The film is made by co-extruding the three layers using a multi-die extruder. The co-extruded film is quenched to about 80–90° F. (26.7–32.2° C.) on a chill roll after extrusion, and post-embossed. The post-embossing step includes passing the co-extruded film between a nip system consisting of a textured metal roll heated to about 190° F. (87.8° C.) and a rubber backup roll. The action of passing the co-extruded film through the nip between the textured roll and the rubber roll at an elevated temperature forms a plurality of protrusions, each having the shape of an oval. The film exiting the embossing station is then rapidly cooled to about 50° F., thus thermoforming the protrusions at a height roughly five times the thickness of the 0.75 mil thick cling wrap.

Example 11

A film as in Example 1 can be made with an additional oxygen barrier layer between the cling layer and the release layer made from ethylene vinyl alcohol, polyester, nylon, or combinations of these materials.

Example 12

The three-layer film of Example 1 was extruded in a slot cast film co-extruder. The polypropylene and concentrate were fed into the first hopper of a multi-manifold slot cast die extruder, which were then fed into a single screw for blending before entering the extruder and then slot cast die. The HDPE/LLDPE mixture was fed into a second feed hopper, which fed into a second single screw for blending before entering the extruder and then the slot cast die.

Two binary compositions were made from the EMA, SIS, and rosin ester tackifier. The first binary comprised 60% by weight EMA and 40% by weight SIS. The second binary comprised 60% by weight EMA and 40% by weight rosin ester tackifier. Each of these binary compositions were compounded in a twin screw compounding apparatus where the compositions were mixed, melted, extruded, quenched in liquid nitrogen, quenched in a water bath, and then pelletized. The pelletized binary compositions were then fed into the third feed hopper of the extruder for mixing and extrusion into the slot cast die.

The films made in the above examples exhibit a good balance of cling and handleability characteristics. Also there were no blocking or bridging processing problems observed during the co-extrusion process. The film of Example 11 should provide an improved barrier to oxygen when compared to the three-layer structure of Example 1.

The foregoing examples have been presented for the purpose of illustration and description only and are not to be construed as limiting the scope of the invention in any way. The scope of the invention is to be determined from the claims appended hereto.

What is claimed is:

1. A plastic wrap comprising:
   a release layer comprising a first polyolefin and an effective amount of a first antiblocking agent;
   an intermediate layer bonded to the release layer, the intermediate layer comprising a second polyolefin resin, the second polyolefin resin comprising HDPE; and
   a cling layer bonded to the intermediate layer, the cling layer comprising at least a base resin, the base resin comprising one of ethylene methyl acrylate and ethylene vinyl acetate, and a tackifier, the tackifier comprising at least a combination of rosin ester and a styrene-isoprene-styrene block copolymer.

2. The plastic wrap of claim 1, wherein the plastic wrap is capable of clinging to at least one of glass, plastic, ceramic, stainless steel, laminated cardboard, and aluminum.

3. The plastic wrap of claim 1, wherein the first antiblocking agent comprises silica having a substantially uniform particle size distribution.

4. The plastic wrap of claim 3, wherein the silica comprises an average particle size of up to about three microns.

5. The plastic wrap of claim 1, wherein the release layer further comprises the first antiblocking agent in an amount of about 1,000 to about 25,000 ppm based on the total weight of the release layer.

6. The plastic wrap of claim 1, wherein the first antiblocking agent comprises calcium carbonate or talc or mixtures thereof.

7. The plastic wrap of claim 1, wherein the first polyolefin resin further comprises at least one of a polypropylene homopolymer and a polypropylene having up to about 5 percent by weight ethylene and mixtures thereof, and wherein the second polyolefin resin further comprises LDPE, LLDPE and mixtures thereof.

8. The plastic wrap of claim 7, wherein the melt flow race of the first polyolefin resin is about 10 grams per 10 minutes to about 50 grams per 10 minutes.

9. The plastic wrap of claim 7, wherein the second polyolefin comprises up to about 40 percent by weight LDPE or LLDPE or mixtures thereof.

10. The plastic wrap of claim 7, wherein the melt index of the HDPE is about 1 gram per 10 minutes to about 20 grains per 10 minutes.

11. The plastic wrap of claim 7, wherein the density of the HDPE is about 0.940 gm/cm$^9$ to about 0.960 gm/cm$^{3.}$ 12. The plastic wrap of claim 1, wherein the release layer comprises about 5 percent to about 30 percent by weight of the total weight of the plastic wrap, the intermediate layer comprises about 40 percent to about 90 percent by weight of the total weight of the plastic wrap, and the cling layer comprises about 5 percent to about 30 percent by weight of the total weight of the plastic wrap.

13. The plastic wrap of claim 1, wherein the total thickness of the plastic wrap is about 0.3 mils to about 1.0 mils.

14. The plastic wrap of claim 1, wherein the thickness of the release layer is about 0.05 mils to about 0.15 mils.

15. The plastic wrap of claim 1, wherein the thickness of the intermediate layer is about 0.4 mils to about 0.5 mils.

16. The plastic wrap of claim 1, wherein the thickness of the cling layer is about 0.05 mils to about 0.2 mils.

17. The plastic wrap of claim 1, wherein the cling force of cling layers of two plastic wraps of substantially identical composition to the plastic wrap of claim 1 is about 300 grams to about 500 grams, as measured in accordance with ASTM D4649.

18. The plastic wrap of claim 1, wherein the cling force of the release layer and the cling layer is up to 100 grams, as measured in accordance with ASTM D4649.

19. The plastic wrap of claim 1, wherein the cling force of release layers of two plastic wraps of substantially identical composition to the plastic wrap of claim 1 is up to about 10 grams, as measured in accordance with ASTM D4649.

20. The plastic wrap of claim 1, wherein the cling layer comprises at least a SIS resin in an amount of from about 15 to about 25 percent by weight, a rosin ester tackifier in an amount of from about 15 to about 25 percent by weight, and a base resin in an amount of from about 50 to about 70 percent by weight.

21. The plastic wrap of claim 20, wherein the SIS copolymer further comprises about 20 percent by weight styrene, a diblock content of greater than about 25 percent by weight, and a melt flow rate greater than about 10 grams per 10 minutes.

22. The plastic wrap of claim 1, wherein the ethylene methyl acrylate resin further comprises about 12 to about 24 weight percent methyl acrylate.

23. The plastic wrap of claim 1, wherein the melt index of the ethylene methyl acrylate resin is about 3 grams per 10 minutes to about 10 grams per 10 minutes.

24. The plastic wrap of claim 1, wherein at least the cling layer further comprises a plurality of protrusions and a base area.

25. The plastic wrap of claim 24, wherein the height of each protrusion is about 3 to about 5 times the total combined thickness of the plastic wrap.

26. The plastic wrap of claim 24, wherein the maximum height of the protrusions is about 6 mils.

27. The plastic wrap of claim 24, wherein the density of the plurality of protrusions is from about 150 to about 500 elements/in$^2$ of plastic wrap.

28. The plastic wrap of claim 1, wherein the clarity of the plastic wrap is less than about 30% as measured by colorimetry and/or a hazemeter.

29. The plastic wrap of claim 1 further comprising an oxygen barrier layer between the cling layer and the release layer, wherein the oxygen barrier layer comprises ethlyene vinyl alcohol, polyester, nylon or combinations thereof.

* * * * *

UNITED STATES PATENT AND TRADEMARK OFFICE
CERTIFICATE OF CORRECTION

PATENT NO. : 6,692,805 B2
DATED : February 17, 2004
INVENTOR(S) : Douglas D. Bonke It is certified that error appears in the above-identified patent and that said Letters Patent is hereby corrected as shown below:

Column 12,
Line 16, insert -- rate -- delete "race".
Line 26, insert -- $gm/cm^3$ -- delete "$gm/cm^9$".

Signed and Sealed this

Twenty-fourth Day of January, 2006

JON W. DUDAS
*Director of the United States Patent and Trademark Office*